United States Patent [19]

Higashihara

[11] Patent Number: 5,628,038
[45] Date of Patent: May 6, 1997

[54] CAMERA HAVING A SUB-MIRROR UNIT

[75] Inventor: Masaki Higashihara, Yokohama, Japan

[73] Assignee: Canon Kabushiki Kaisha, Tokyo, Japan

[21] Appl. No.: 227,349

[22] Filed: Apr. 14, 1994

[30] Foreign Application Priority Data

Apr. 16, 1993 [JP] Japan ................................. 5-089894
Dec. 20, 1993 [JP] Japan ................................. 5-319992

[51] Int. Cl.⁶ ........................... G03B 7/099; G03B 17/00
[52] U.S. Cl. ............................................ 396/272; 396/447
[58] Field of Search ............................. 354/479, 202, 354/152; 359/838; 118/721; 396/447, 272

[56] References Cited

U.S. PATENT DOCUMENTS

| | | | |
|---|---|---|---|
| 4,963,393 | 10/1990 | Goela et al. | 427/248.1 |
| 5,130,740 | 7/1992 | Suda et al. | 354/479 |
| 5,436,753 | 7/1995 | Hayakawa | 359/213 |

FOREIGN PATENT DOCUMENTS 56-164235  12/1981  Japan.

*Primary Examiner*—Safet Metjahic
*Assistant Examiner*—Eric Nelson
*Attorney, Agent, or Firm*—Fitzpatrick, Cella, Harper & Scinto

[57] ABSTRACT

A camera with a mirror device comprises a first mirror, i.e., a main mirror, device for reflecting object light, and a second mirror, i.e., a sub-mirror, device for reflecting light transmitted through the first mirror device to another device, i.e., a focus detector. The second mirror device has a reflective layer formed as a sub-mirror surface formed directly on a base member. With the sub-mirror surface formed by, e.g., evaporation directly on a partial protruded area of the base member, the manufacture process is facilitated, a sub-mirror area can be increased, and reliability and durability are improved because the sub-mirror will not experience variations in its mounting angle or be subject to peeling-off from a separate base member.

14 Claims, 13 Drawing Sheets

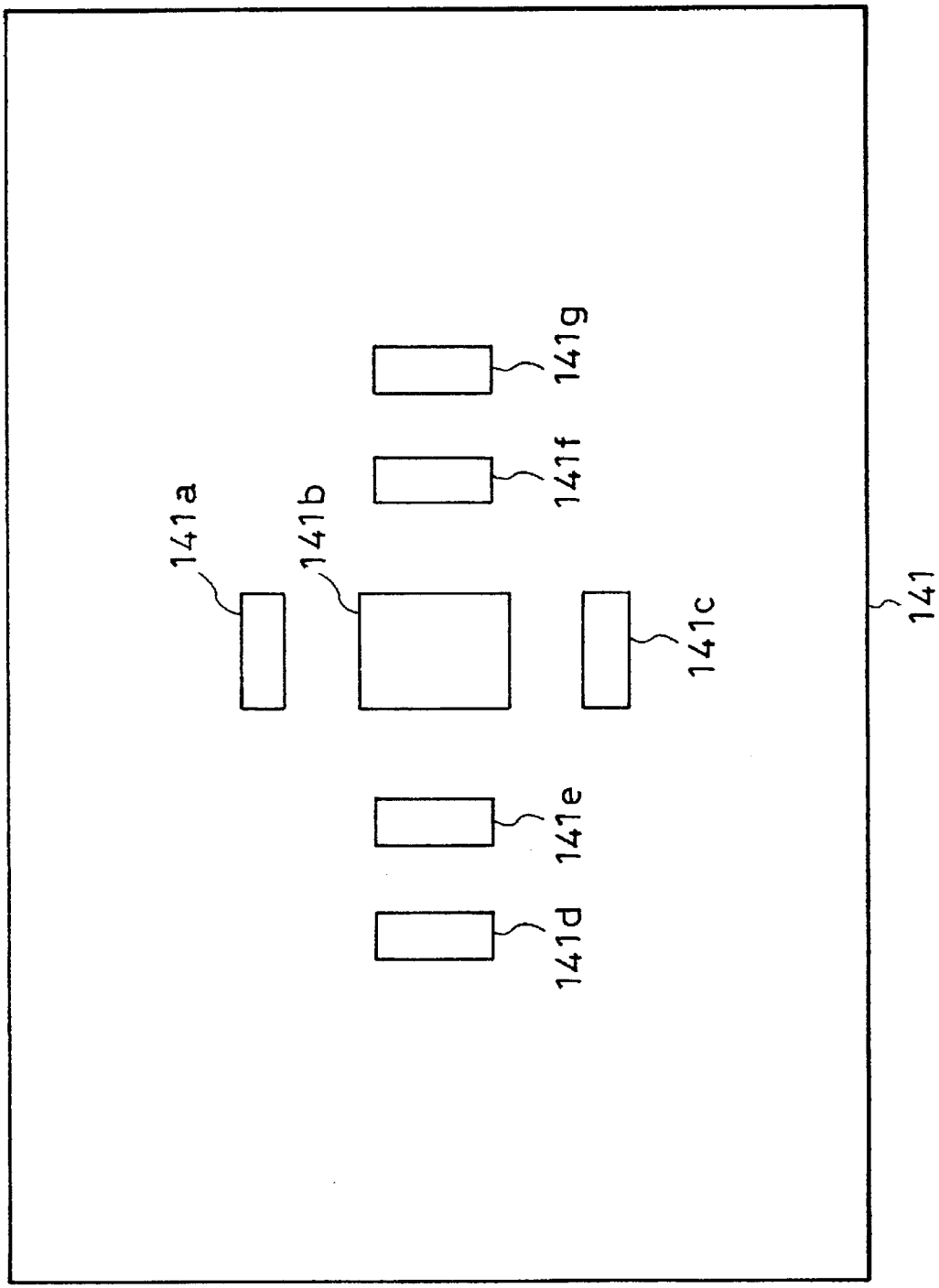

CAMERA HAVING A SUB-MIRROR UNIT

BACKGROUND OF THE INVENTION

1. Field of the Invention

The present invention relates to a sub-mirror unit for use in a camera. More specifically, the present invention pertains to a single-lens reflex camera featuring an integrally-formed sub-mirror and a method for making the sub-mirror.

2. Description of the Related Art

Initially, a prior art sub-mirror unit 3 for use in a single-lens reflex camera will be described with reference to FIGS. 5 and 6.

In these figures, reference character 3c denotes a sub-mirror and reference character 3a denotes a sub-mirror supporting plate for fixedly supporting the sub-mirror 3c.

The sub-mirror 3c is formed of a glass plate on the surface of which a material is evaporated to form a reflective layer. The sub-mirror 3c is mounted such that its surface including the reflective layer faces an object lens of the camera, and is fixedly bonded at its rear surface to the sub-mirror supporting plate 3a by means of a double-coated adhesive tape 3b.

The above-described, prior art sub-mirror unit 3 has the following disadvantages:

(1) Since the sub-mirror unit 3 requires a number of parts and hence a number of assembly steps, the parts and assembly costs are high.

(2) The sub-mirror 3a is prone to mounting angle variations or detachment due to a failure in adhesion or peeling-off of the sub-mirror 3a from the supporting plate 3b.

(3) Since cracks and/or chips are created in the glass edges when a glass plate is cut into a predetermined size, it is necessary to allow a larger margin between an effective mirror area and the glass edges, or to grind the glass edges. However, if the distance between the effective mirror area and the glass edges is increased, the sub-mirror 3c must be made larger in size contrary to the goal of reducing the size of optical equipment, such as cameras. Also, if the glass edges are ground, the manufacturing cost of the sub-mirror 3a would be significantly increased.

(4) Because the glass sub-mirror is bonded to a non-glass material sub-mirror supporting plate 3a, variations in the ambient temperature tend to produce distortions in both structures and/or cause variations in the mounting angle and/or result in peeling-off of the sub-mirror 3a from the supporting plate 3b due to a difference in their respective coefficients of thermal expansion.

FIG. 14 is a sectional view showing a layout of the primary components of a prior art single-lens reflex camera having an automatic focus adjusting device. An object lens (not shown) is attached to a mount 101, and light passing through the object lens is reflected by a main mirror unit 102 upwardly to a focusing plate 106. More specifically, a portion of the light from the object lens passes through the main mirror unit 102 and, after being reflected by a sub-mirror unit 103, is guided to a focus detector 104 positioned under the sub-mirror unit 103. A photographer observes an image of the object formed on the focusing plate 106 through a pentaprism 107 and an eyepiece lens 108.

The sub-mirror unit 103 is constructed in the same manner as the sub-mirror unit 3 as described above with reference to FIG. 6.

As previously discussed, since small cracks and/or chips are created in the glass edges when a glass plate is cut into a predetermined size, it is necessary to allow a larger margin between an effective mirror area and the glass edges, or to grind the glass edges. If the margin δ between the effective mirror area and the glass edges is set to be large as shown in FIG. 14, the light guided to the focus detector 104 would be narrowed particularly in the vertical, i.e., up and down, direction of the object field, making it difficult to enlarge a focus detecting area in the vertical direction of the object field. If the size of the sub-mirror unit 103 is increased, the focus detecting area can be enlarged in the vertical direction of the object field. In practice, however, because the sub-mirror unit 103 is positioned between the main mirror unit 102 and a shutter device 105, it is problematical to increase the size of the sub-mirror unit 103. Also, if the glass edges are ground or cut, the manufacturing costs are significantly increased.

Further, as previously discussed in connection with sub-mirror unit 3, because the glass sub-mirror 3c is bonded to the non-glass metal sub-mirror supporting plate 3a, variations in the ambient temperature tend to produce distortions in both structures, or cause a change in the mounting angle and peeling-off of the sub-mirror 3c from the sub-mirror supporting plate 3a due to a difference in the coefficient of thermal expansion therebetween. These problems increase as the sub-mirror becomes larger. This means that an increase in the size of the sub-mirror 3c due to, e.g., an enlargement of the focus detecting area is not desirable.

SUMMARY OF THE INVENTION

According to one aspect of the invention, there is provided a camera with a mirror device having a reflecting surface which is formed as a mirror directly on a base member.

According to one aspect of the invention, there is provided a camera with a sub-mirror device for reflecting part of object light transmitted through a main mirror toward a focus detector, wherein the focus detector includes a plurality of focus detecting areas set at least in the up-and-down direction of an image field, and tile sub-mirror device has a reflecting surface which is formed as a sub-mirror directly on a base member.

According to another aspect of the invention, there is provided a camera having a mirror assembly, the camera comprising a first mirror device for reflecting a first portion of object light and transmitting a second portion of the object light, and a second mirror device for reflecting the transmitted light, the second mirror device including a base member with a reflecting layer formed as a mirror surface directly on a portion of the base member.

According to a further aspect of the invention, there is provided a method of manufacturing a mirror device for use in a camera, the method comprising tile steps of providing a base member with a mirror surface area formed thereon, masking the mirror surface area using a mask member which has an aperture corresponding in size to the mirror surface area, and forming a reflecting layer on the mirror surface area of the base member.

According to yet another aspect of the invention, there is provided a camera having a mirror assembly, comprising a mirror device for reflecting object light to an optical device, the mirror device including a base member, including a mirror surface area, formed directly on the base member, and a reflecting layer provided on the mirror surface area.

According to a yet further aspect of the invention, there is provided a camera having a mirror assembly, the camera comprising a first mirror device for transmitting at least a portion of object light, a focus detecting device including a plurality of focus detecting areas disposed at least in the up and down direction of an image field, and a second mirror device for reflecting the object light transmitted through the first mirror device to the focus detecting device, the second mirror device including a base member and a reflecting layer formed as a mirror surface directly on the base member.

BRIEF DESCRIPTION OF THE DRAWINGS

FIG. 12 is an explanatory view showing focus detecting areas in the focus detector of FIG. 11.

DETAILED DESCRIPTION OF THE PREFERRED EMBODIMENTS

Hereinafter, a first embodiment of tile present invention will be described with reference to FIGS. 1 to 4.

Figure 1:
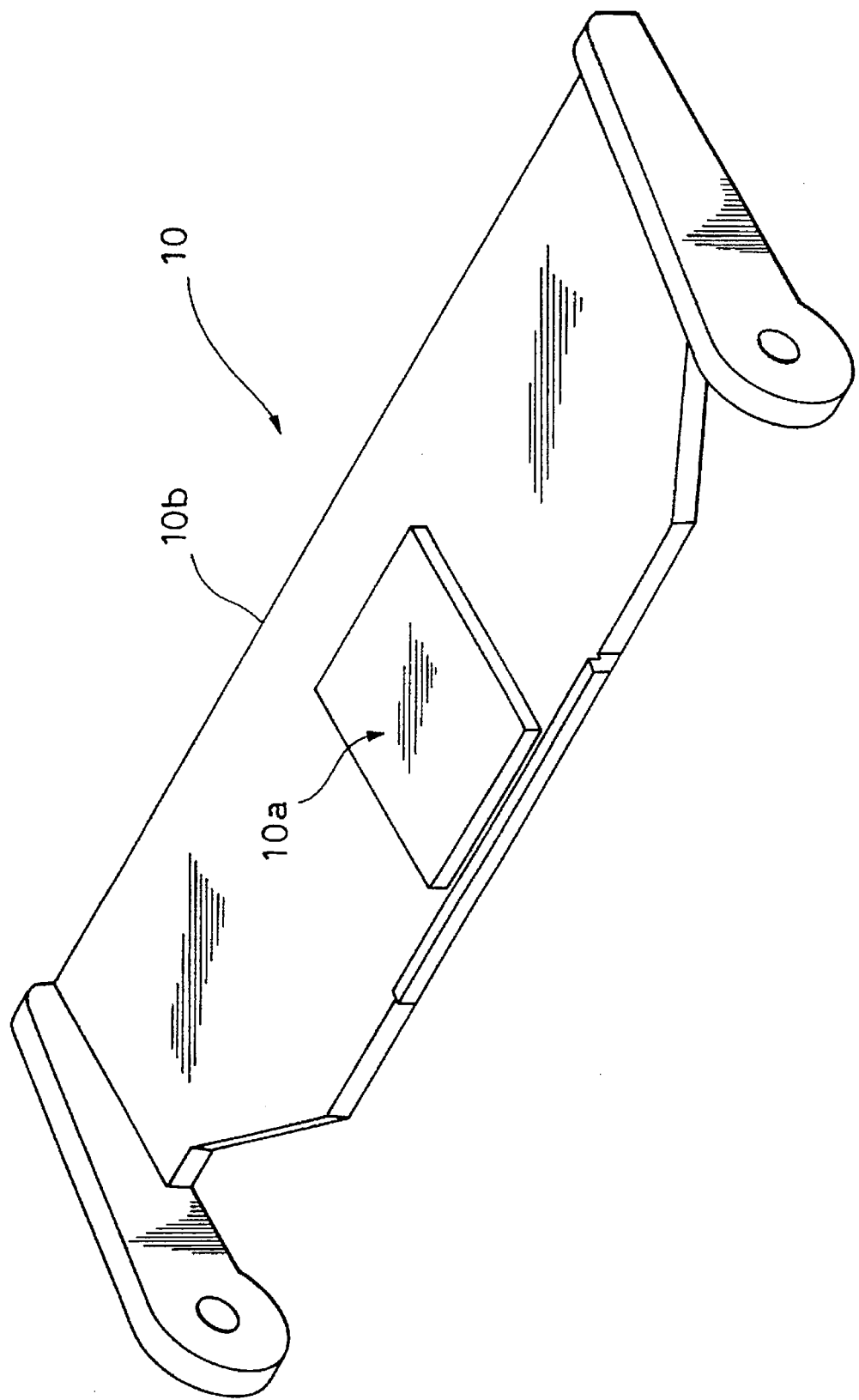
FIG. 1 is a perspective view of a sub-mirror unit as a first embodiment.
Figure 2:
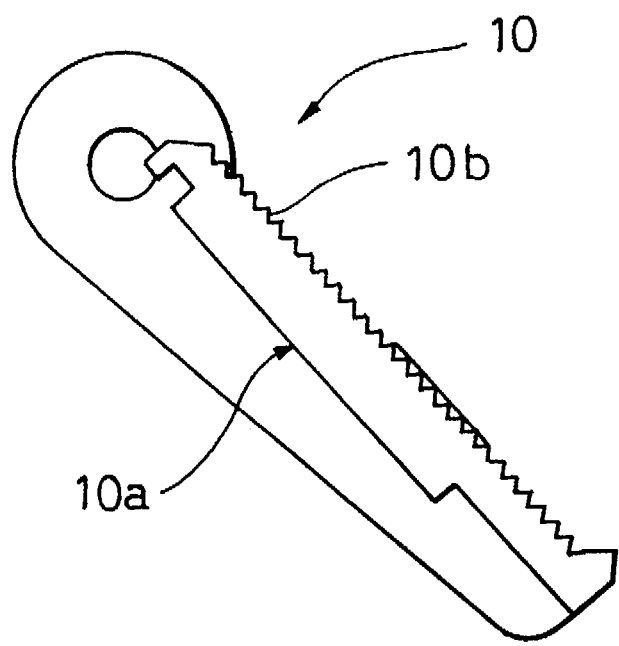
FIG. 2 is a sectional view of the sub-mirror unit shown in FIG. 1.
Figure 3:
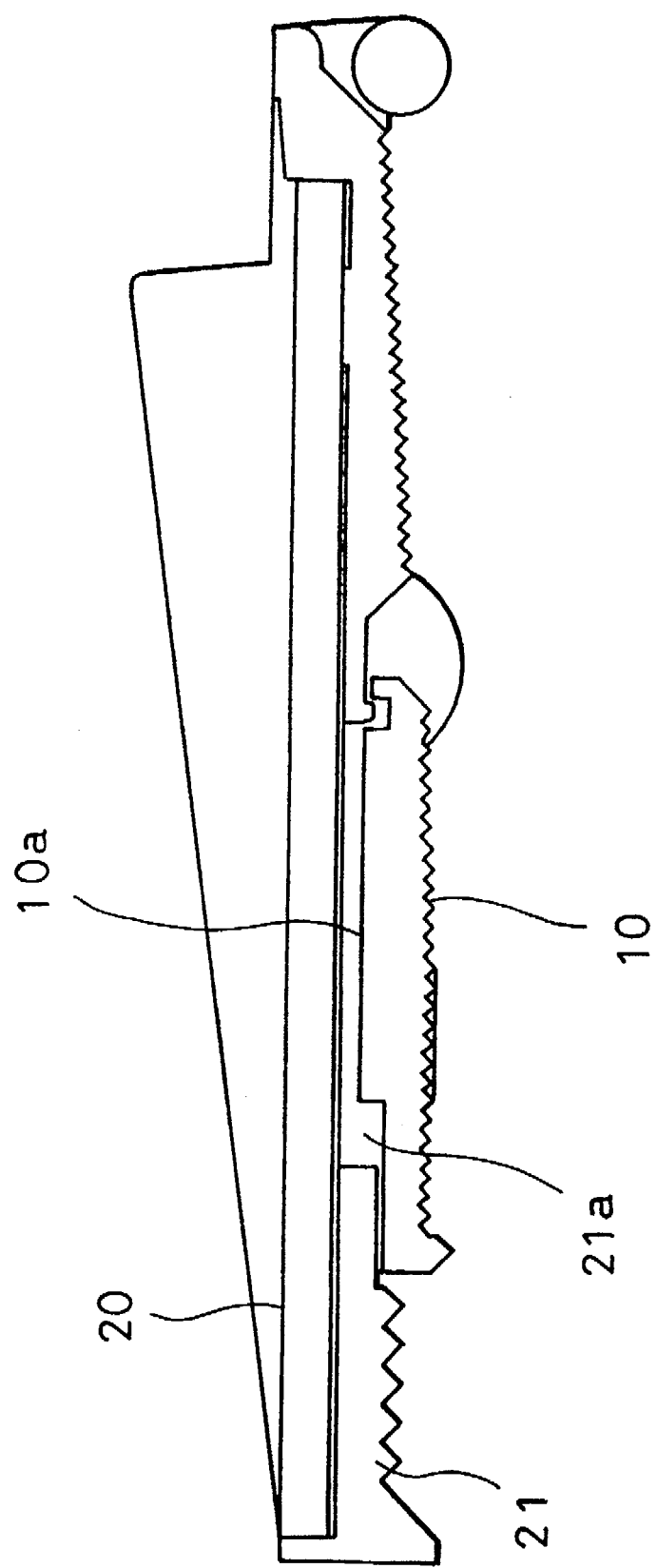
FIG. 3 is a view showing the positional relationship between a main mirror unit of a single-lens reflex camera and the sub-mirror unit of the first embodiment of the invention in a mirror-up state of both units.

In FIGS. 1 to 3, reference numeral 10 denotes a sub-mirror unit according to the present invention. The sub-mirror unit 10 comprises a sub-mirror supporting plate, i.e., base member, 10b including a sub-mirror area i.e., reflecting surface, 10a which is molded integrally with the sub-mirror supporting plate 10b. The sub-mirror unit 10 is formed of, e.g., high-strength synthetic resin, such as polycarbonate synthetic resin and acrylic synthetic resin. The area of the sub-mirror 10a is designed as a boss so as to protrude from the surface of tile sub-mirror supporting plate 10b. Therefore, the sub-mirror area 10a is thicker and hence more rigid than the surrounding portions of the sub-mirror supporting plate 10b. As a result, when the sub-mirror unit 10 is subjected to external forces, the sub-mirror area 10a is prevented from deforming and hence maintains a high degree of flatness. The reflecting surface of the sub-mirror area 10a is formed directly on the sub-mirror supporting plate 10b by evaporation of a material to form a reflective layer, for example.

When a main mirror 20 inside a camera is in a mirror-up position, as shown in FIG. 3, the sub-mirror area 10a enters an aperture 21a of a main mirror supporting plate 21. Accordingly, when the main mirror 20 and the sub-mirror unit 10 are brought to a mirror-up state, the sub-mirror area 10a will not collide with the main mirror supporting plate 21 and the total thickness of the mirror device can be reduced because the sub-mirror area 10a is accommodated in the aperture 21a of the main mirror receiving plate 21.

Figure 4:
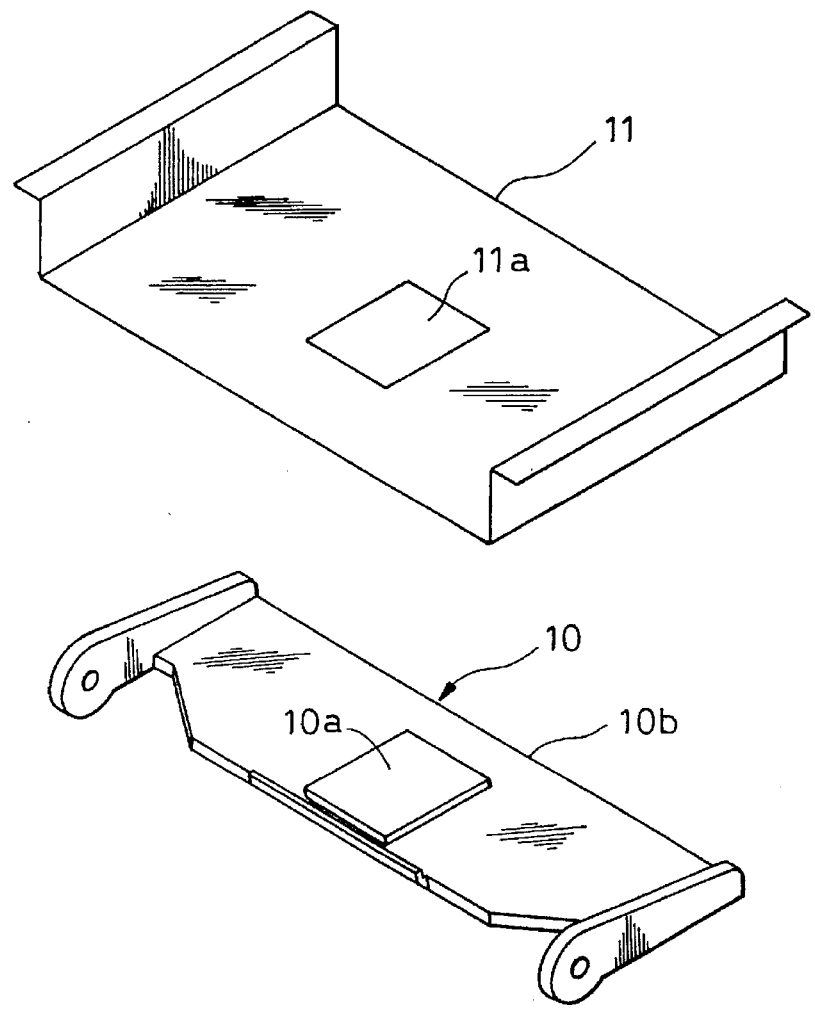
FIG. 4 is a perspective view showing a mask member 11 for use in evaporating a reflective layer on the surface of a sub-mirror area 10a of the sub-mirror unit of the first embodiment.

FIG. 4 shows a mask member 11 for use in evaporating a material to form a reflective layer on the surface or the sub-mirror area 10a in a manufacturing process of the sub-mirror unit 10 of the first embodiment. The mask member 11 has an opening 11a approximately sized to the sub-mirror area 10a of the sub-mirror unit 10. When evaporating a material to form a reflective layer on the surface of the sub-mirror area 10a, the protrusion defining the sub-mirror area 10a is positioned in the aperture 11a of the mask member 11, thereby masking the sub-mirror unit 10 except for the sub-mirror area. In this condition, a reflective layer is formed by evaporation of a material on the surface of the sub-mirror area 10a.

The sub-mirror unit 10 according to the first embodiment of the invention and the manufacturing method thereof, as described hereinabove, provides the following advantages.

Figure 5:
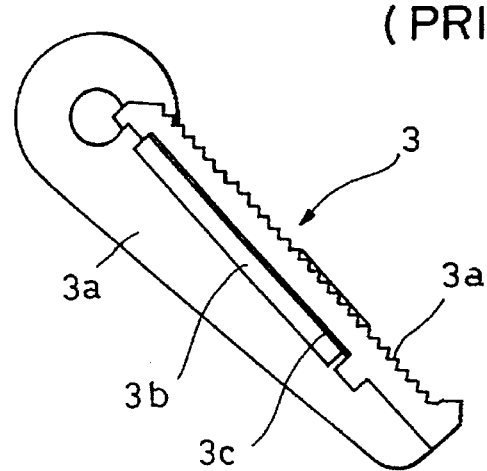
FIG. 5 is a sectional view of a prior art sub-mirror unit.
Figure 6:
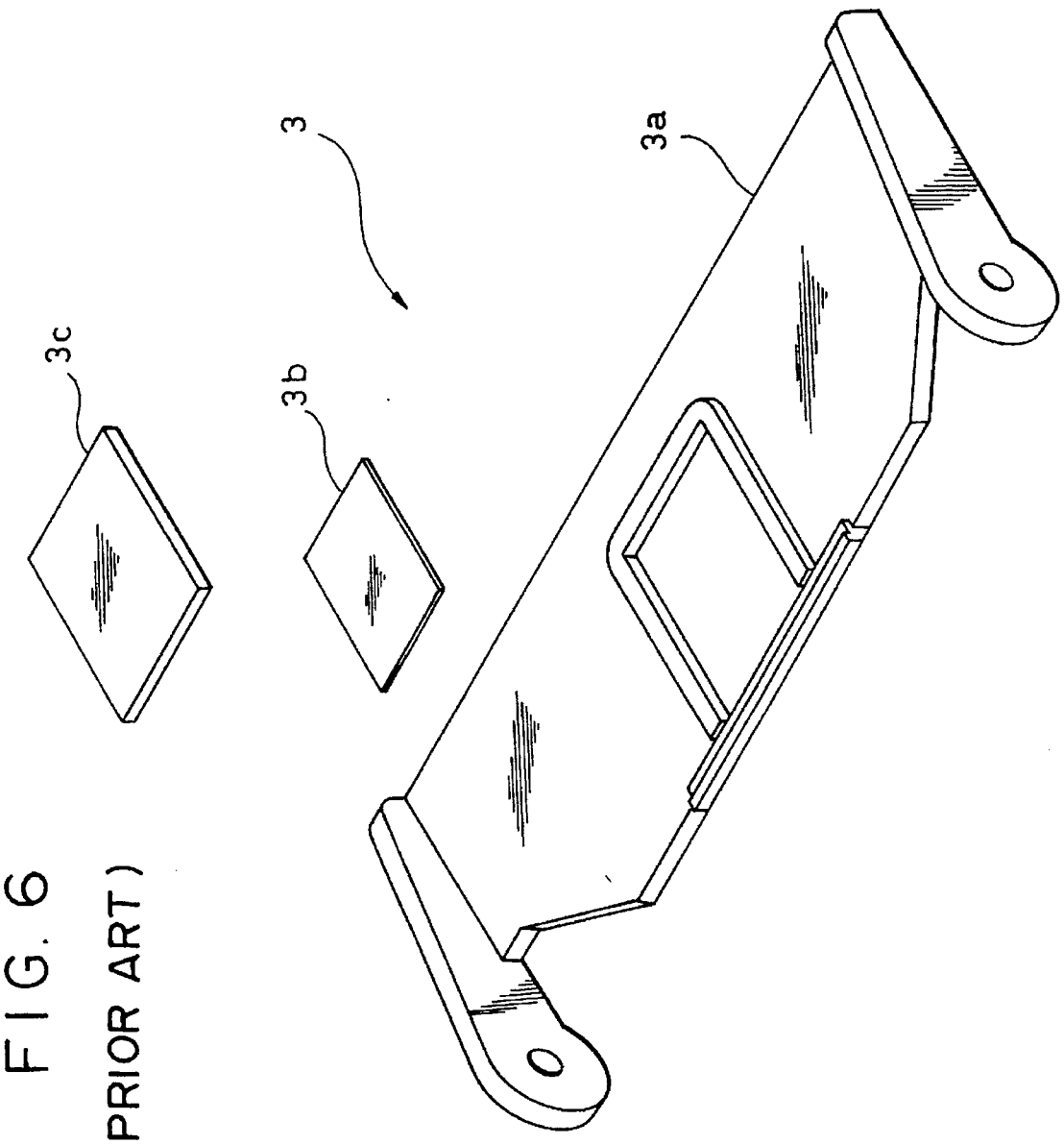
FIG. 6 is an exploded perspective view of the prior art sub-mirror unit shown in FIG. 5.

(1) Since the number of parts and the number of assembly steps are fewer than those required for the prior art sub-mirror unit 3 shown in FIGS. 5 and 6, it is possible to improve the manufacturing efficiency and to reduce the production cost of the disclosed embodiment of the invention.

(2) Since the sub-mirror area 10a can be made smaller in size than the prior art sub-mirror 3c, it is possible to reduce the size of the sub-mirror area 10a and hence the cameras in which it is used.

(3) Since the sub-mirror unit 10 is essentially integral with the supporting plate, the sub-mirror unit 10 will not be subject to a change in its mounting angle and deformation or peeling-off, with the result of a significant improvement in reliability and durability of cameras in which it is used.

(4) Since the sub-mirror unit 10 protrudes from the supporting plate when a material for forming a reflective layer is evaporated on the sub-mirror surface 10a, it is possible to simply position the mask member 11 and to more easily form the reflective than it is to accurately mount the prior art sub-mirror 3c.

(5) By increasing the thickness of the sub-mirror area 10c, its rigidity and flatness can be increased.

Figure 7:
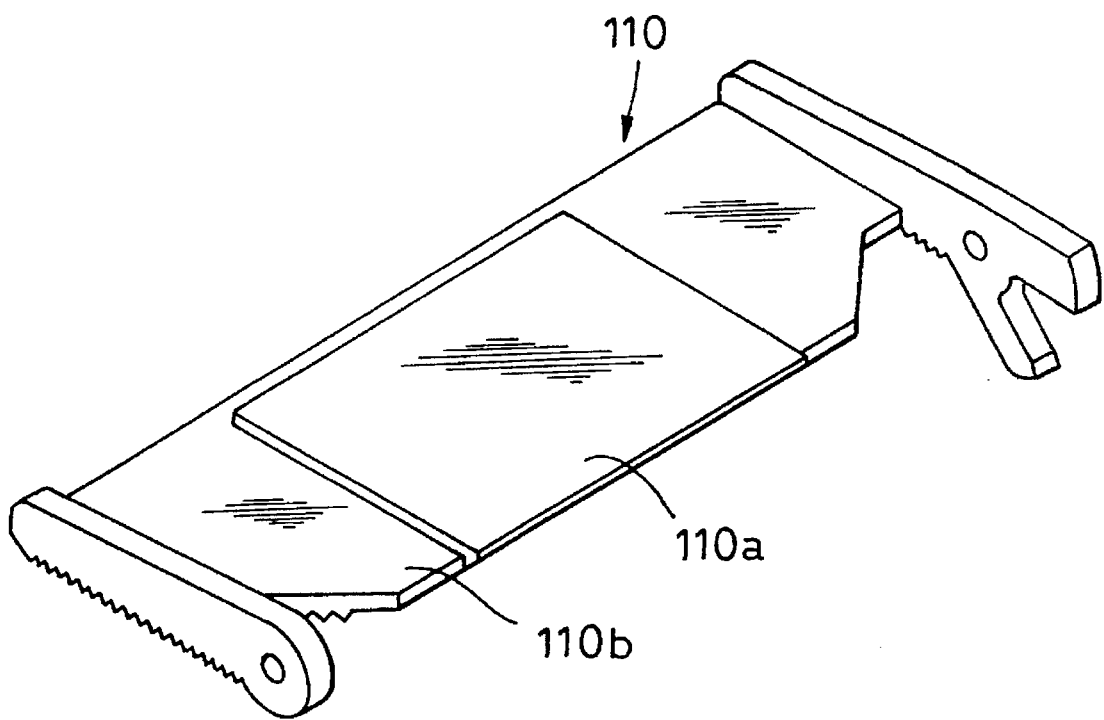
FIG. 7 is a perspective view of a sub-mirror unit as a second embodiment of the invention.

FIG. 7 shows a sub-mirror unit 110 as a second embodiment. In the sub-mirror unit 110, a reflecting surface 110a as a sub-mirror area is formed directly on a sub-mirror supporting plate, i.e., base member, 110b. The sub-mirror supporting plate 110b is molded such that the reflecting surface 110a thereon protrudes from the surface of the sub-mirror supporting plate 110b. Therefore, the sub-mirror area including the reflecting surface 110b is thicker and more rigid than the surrounding portions of the sub-mirror supporting plate 110b. As a result, when the sub-mirror unit 110 is subjected to external forces, the reflecting surface 110a on the sub-mirror supporting plate 110b can be prevented from deforming and hence can better maintain a high degree of flatness.

Figure 9:
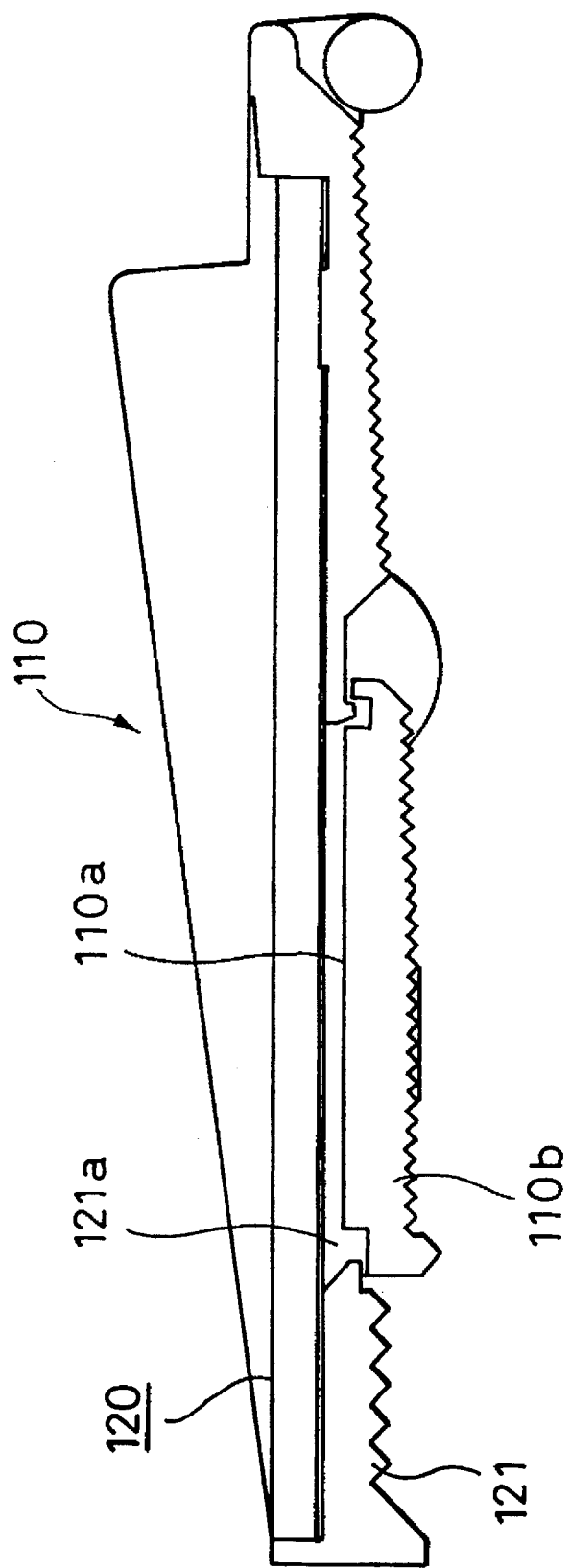
FIG. 9 is a view slowing the positional relationship between a main mirror unit of a single-lens reflex camera and the sub-mirror unit of FIG. 7 in a mirror-up state of both the units.

With reference to FIG. 9, in a mirror-up state, i.e., when a main mirror unit 120 is retracted at the time of exposure, the sub-mirror reflecting surface 110a of the sub-mirror unit 110 enters an aperture 121a of a main mirror supporting plate 21. Accordingly, the sub-mirror reflecting surface 110a of the sub-mirror unit 110 will not collide with the main mirror supporting plate 121 and the total thickness of the mirror device will not be increased.

Figure 8:
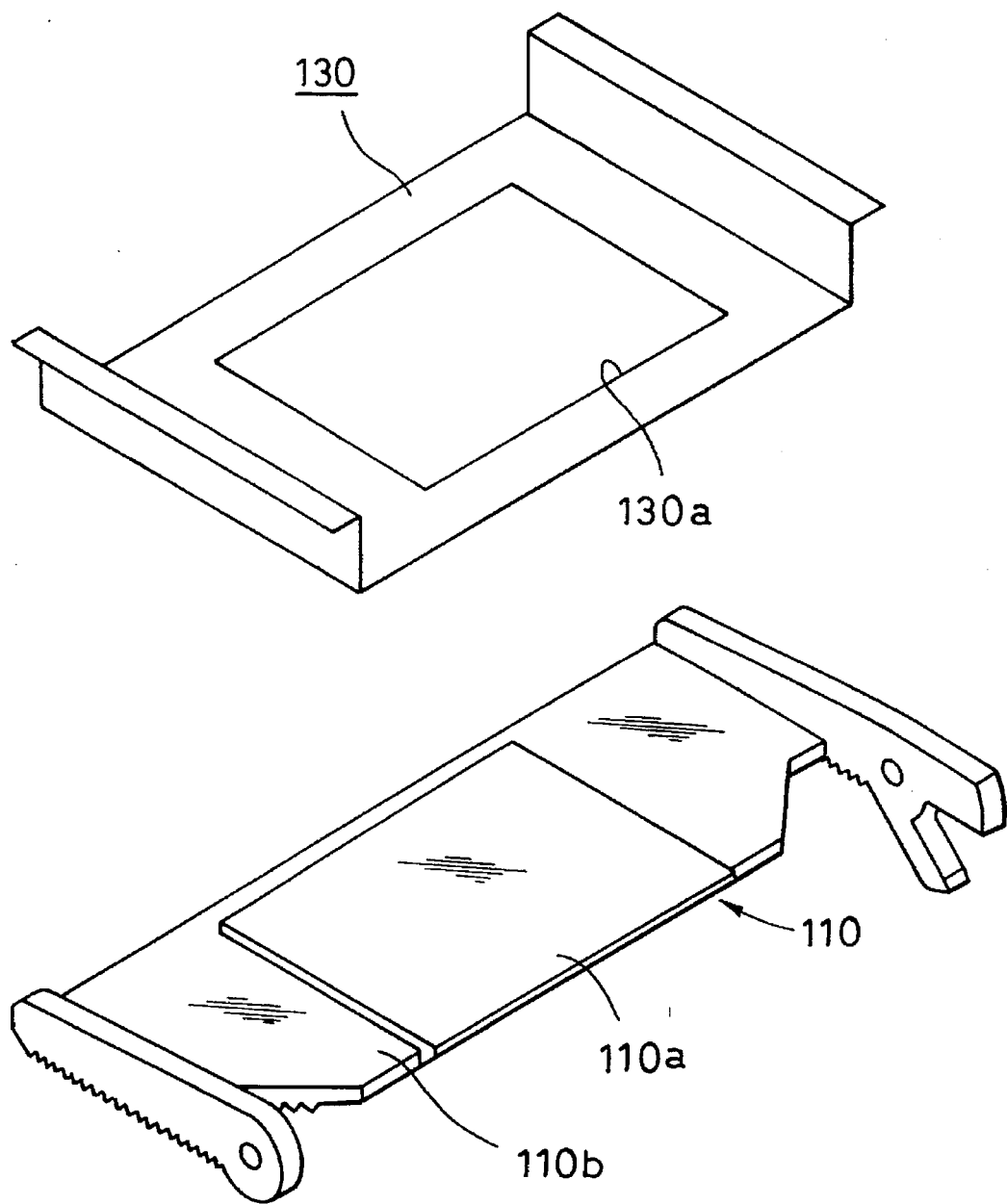
FIG. 8 is a perspective view showing the sub-mirror unit of FIG. 7 and a mask member for use in evaporating a material to form a reflecting surface (corresponding to a sub-mirror area) in the sub-mirror unit.

FIG. 8 shows one example of a mask member 130 for use in evaporating a reflective layer in a manufacturing process of the sub-mirror unit 110 of the second embodiment. The mask member 130 has an opening 130a approximately sized to an outer periphery of the sub-mirror reflecting surface 110a, as the sub-mirror area, of the sub-mirror unit 110. When evaporating a material to form a reflective layer on the surface of the sub-mirror area defining the reflecting surface 110a, the protruding area of the reflecting surface 110a is placed in the aperture 130a of the mask member 130, whereby the mask member 130 can be easily and precisely positioned without the need for a specific positioning member. Accordingly, the mask member and the sub-mirror unit are simple in configuration with the result of keeping production costs low.

Figure 10:
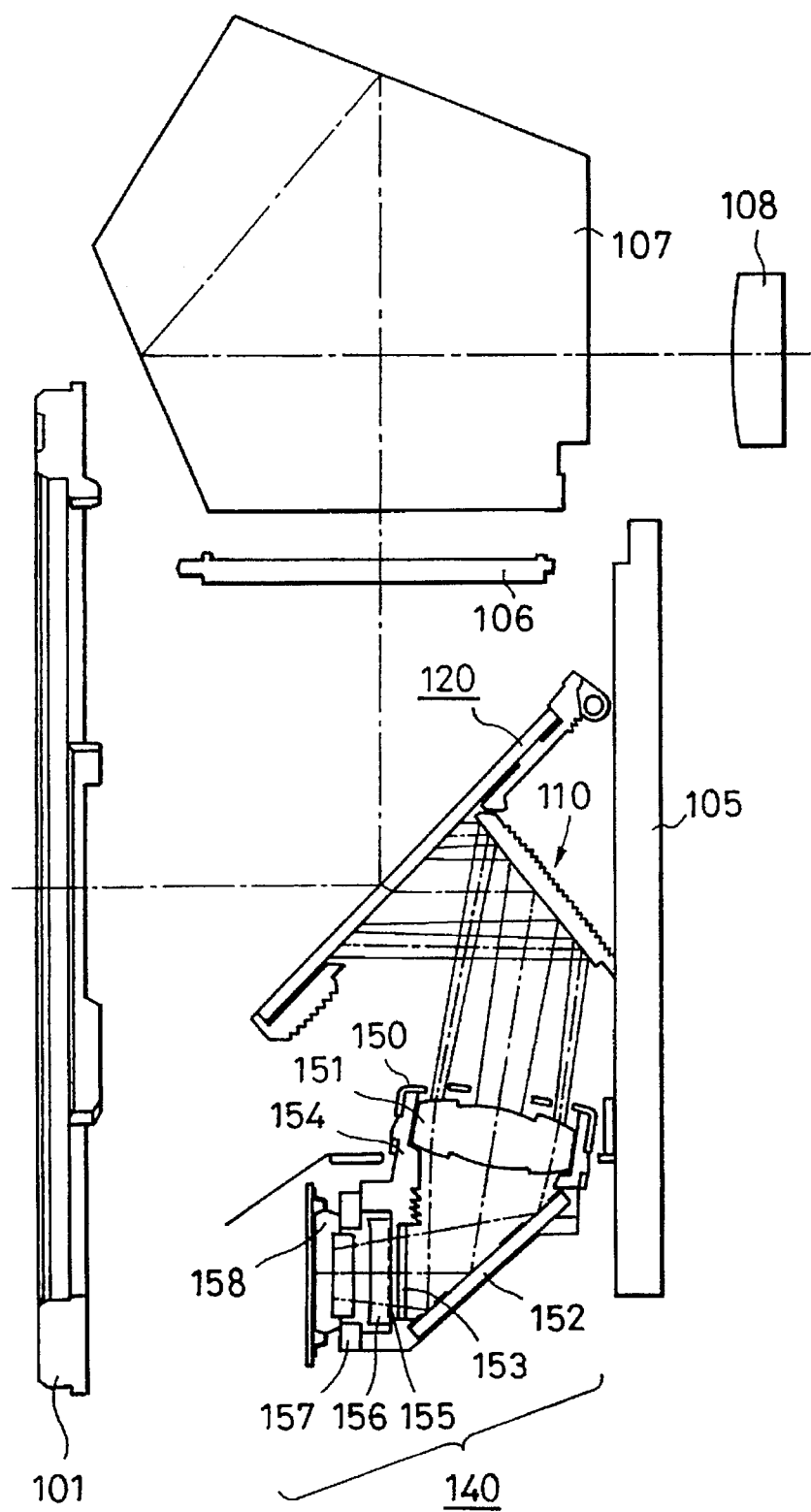
FIG. 10 is a sectional view of a camera in which tile sub-mirror unit of FIG. 7 is assembled.
Figure 14:
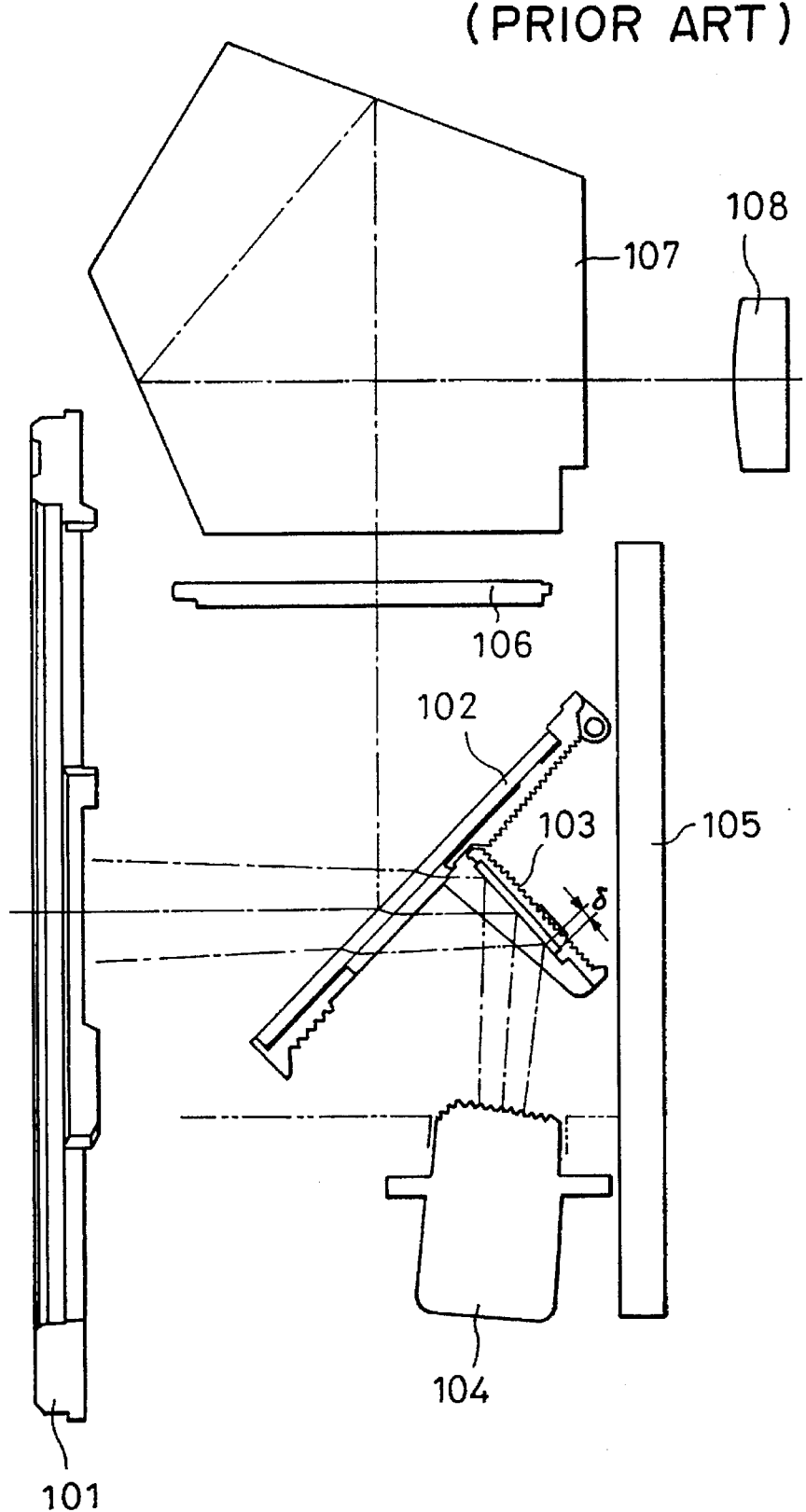
FIG. 14 is a sectional view of a prior art camera in which the prior art sub-mirror unit is assembled.

FIG. 10 shows a condition wherein the sub-mirror unit 110 of FIG. 7 is assembled in a single-lens reflex camera. Note that a focus detector 140 in FIG. 10 is also quite different from the prior art arrangement shown in FIG. 14.

Figure 11:
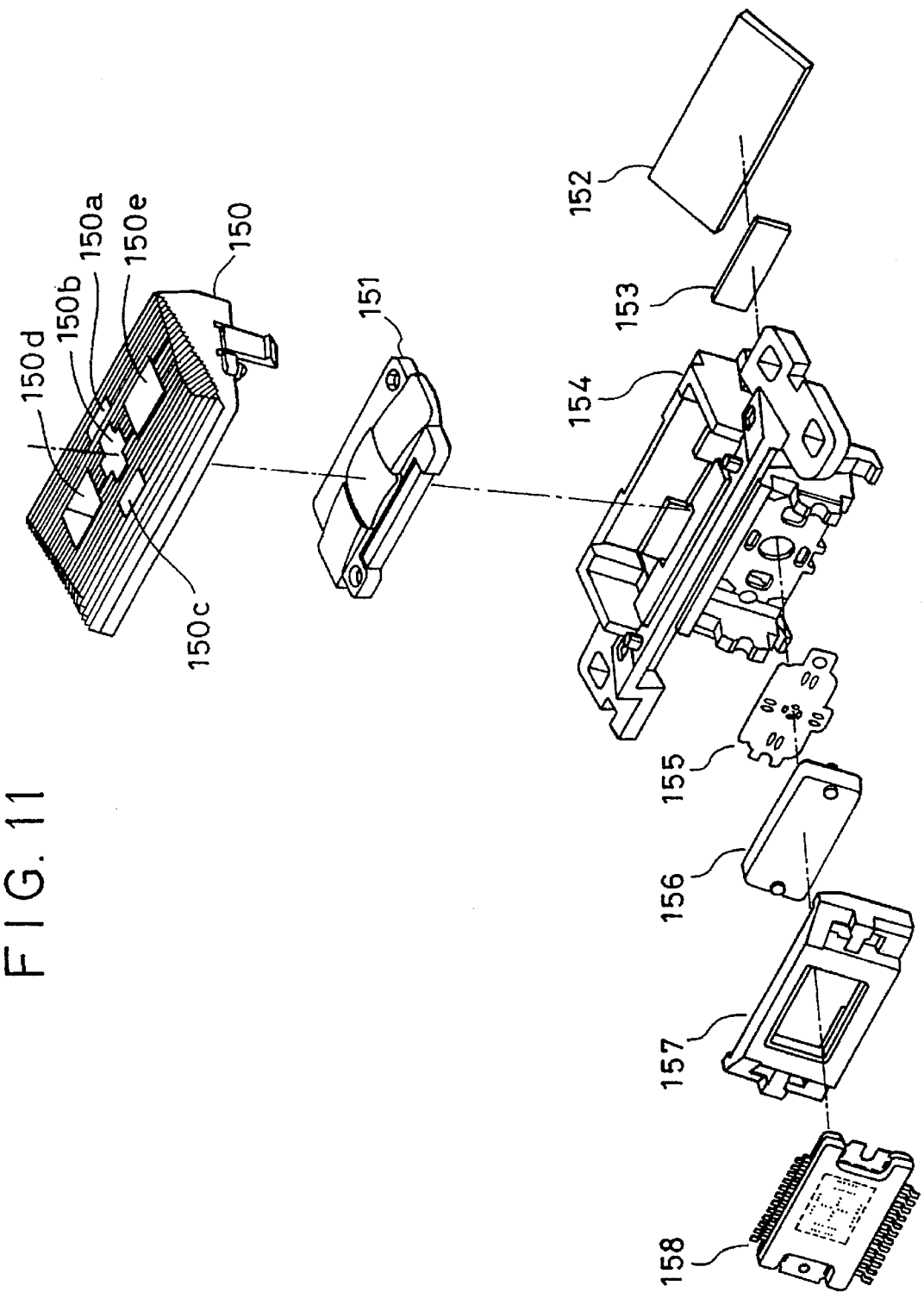
FIG. 11 is an exploded perspective view of a focus detector shown in FIG. 10.

The components in FIG. 10 differing from those in the prior art arrangement are the sub-mirror unit 110, the main mirror unit 120, and the focus detector 140. With reference to FIG. 9, in the main mirror unit 120, an area of the aperture 121a of the main mirror supporting plate 121 is formed corresponding to that of the sub-mirror reflecting surface 110b of the sub-mirror unit 110, i.e., so as to be larger than the prior art arrangements. As shown in FIG. 11, the focus detector 140 comprises, a light shielding cover 150 formed with a plurality of apertures 150a to 150e for defining focus detecting areas, a field lens 151, a mirror 152 for deflecting an optical beam, a filter 153 for removing infrared rays, a support member 154 for supporting the focus detector 140 assembled as a one-piece unit, a diaphragm 155 for dividing a pupil, a secondary lens 156 for forming an image of the object on a sensor 158, and a support frame 157 for supporting the sensor 158, which reads the image and performs photoelectric conversion.

Figures 13A, 13B:
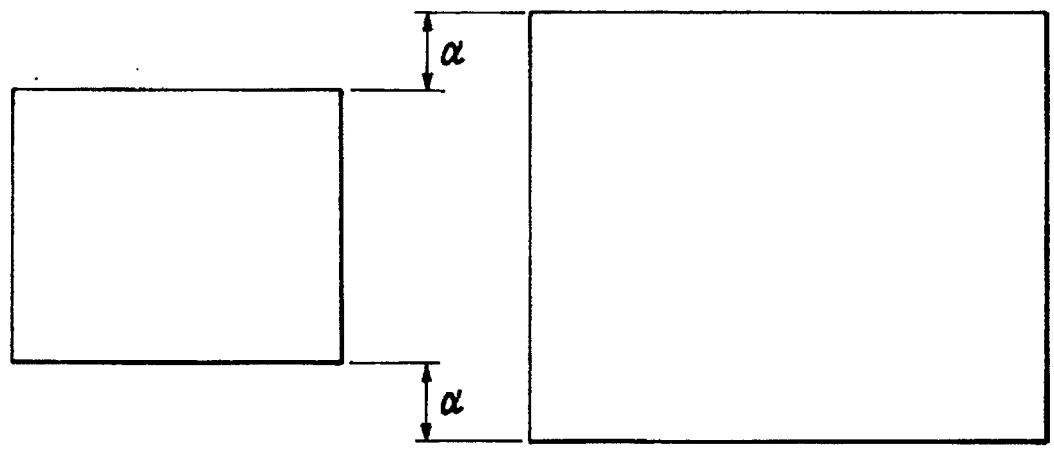
FIG. 13(a) and 13(b) are explanatory views comparing a focus detection enable area between the prior art and the second embodiment of the invention.

As will be apparent from FIG. 12, in this embodiment a total of seven focus detecting areas 141a to 141g are provided in an object field, i.e., photographing field 141. Particularly important is that the plurality of focus detecting areas 141a, 141b, and 141c are formed in the up-and-down, i.e., vertical, direction of the object field 141. The reason why the plurality of focus detecting areas 141a to 141c can be formed in the vertical direction of the object field 141 in this embodiment is that it provides an increase in the vertical size of the object field by forming the sub-mirror reflecting surface 110a directly on the sub-mirror unit 110. This is easily understood from the fact that, as shown in FIG. 13, a focus detection enable area in this embodiment shown at FIG. 13(b) can be set to be larger than that in the prior art, as illustrated in FIG. 13(a) by an amount equal to 2α(or α+α) in the vertical direction of the object field (image field). Additionally, the apertures 150a, 150b, 150c, 150d, and 150e of the light-shielding cover 150 shown in FIG. 11, respectively, correspond to the focus detecting areas 141a, 141b, 141c, 141d, and 141e, and 141f and 141g.

According to the second embodiment described above, in a camera with a sub-mirror unit for reflecting light from the object lens toward a focus detector, the sub-mirror unit comprises a sub-mirror base member on which a reflecting surface as a sub-mirror is formed directly, and the focus detector includes a plurality of focus detecting areas set at least in the up and down direction of an object field. As a result, the following advantaged can be provided:

(1) Since there is no need of leaving such a margin as required in the prior art at the glass edges of a sub-mirror area, i.e., reflecting surface area, of the sub-mirror unit, the sub-mirror area can be enlarged without increasing the size of the sub-mirror unit. It is also possible to increase the design flexibility in the edge shape of the sub-mirror area and to improve machining accuracy, with the result that the plurality of focus detecting areas can be set in the focus detector particularly in the vertical direction of the object field.

(2) Since the number of parts and the number of assembly steps are reduced, production costs can be minimized.

(3) Since the sub-mirror will not experience a variation in the mounting angle of the reflecting surface or peeling-off, reliability and durability are improved.

With such an arrangement wherein the reflecting surface area of the sub-mirror base member is formed on a protruding area, the following additional advantages can be provided:

(4) Rigidity and flatness of the sub-mirror area including the reflecting surface can be increased.

(5) In a step of, e.g., evaporation of a material for forming the reflecting surface, a mask member can be easily positioned with the need for a positioning guide outside of the protruding area.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera having a mirror assembly, said camera comprising:
   (a) a first mirror device for reflecting a first portion of object light and transmitting a second portion of the object light; and
   (b) a second mirror device for reflecting the second portion of the object light transmitted through said first mirror device, said second mirror device including a base member having a protruding portion extending from a surface of said base member and a reflecting layer formed solely on said protruding portion of said base member.

2. A camera according to claim 1, wherein said reflecting layer is formed by vapor deposition of a material on the surface of said protruding portion of said base member.

3. A camera according to claim 1, further comprising a finder optical system and a focus detecting device, wherein said first mirror device reflects the first portion of object light toward said finder optical system, and said second mirror device reflects the second portion of object light transmitted through said first mirror device toward said focus detecting device.

4. A camera according to claim 3, wherein said second mirror device is attached to said camera so as to be swingable with respect to said first mirror device.

5. A method of manufacturing a mirror device for use in a camera, said method comprising the steps of:

providing a base member having a protruding portion formed thereon;

masking said base member excepting said protruding portion using a mask member which has an aperture corresponding in size to said protruding portion, and forming a reflecting layer solely on a surface of said protruding portion of said base member.

6. A method of manufacturing a mirror device according to claim 5, wherein said reflecting layer is formed by vapor deposition of a material on the surface of said protruding portion of said base member.

7. A camera having a mirror assembly, comprising:

a mirror device for reflecting object light to an optical device, said mirror device including:

a base member having a protruding portion extending from a surface of said base member, and a reflecting layer provided solely on a surface of said protruding portion of said base member.

8. A camera according to claim 7, wherein said reflecting layer is formed by vapor deposition of a material on the surface of said protruding portion of said base member.

9. A camera with a mirror device according to claim 7, where in said optical device comprises a focus detecting device.

10. A camera having a mirror assembly, said camera comprising:

a first mirror device for transmitting at least a portion of object light;

a focus detecting device including a plurality of focus detecting areas disposed at least in the up and down direction of an image field; and a second mirror device for reflecting object light transmitted through said first mirror device to said focus detecting device, said second mirror device including a base member having a protruding portion extending from a surface of said base member and a reflecting layer forming a mirror surface formed solely on a surface of said protruding portion.

11. A camera according to claim 10, wherein said reflecting layer is formed by vapor deposition of a material on the surface of said protruding portion of said base member.

12. A camera according to claim 10, wherein said second mirror device is attached to said camera to be swingable with respect to said first mirror device.

13. A camera according to claim 10, wherein said focus detecting device comprises a plurality of focus detecting areas which are disposed in a up and down direction and a right and left direction of an image field.

14. A camera according to claim 13, wherein an area of said reflecting layer corresponds to said plurality of focus detecting areas.

* * * * *

UNITED STATES PATENT AND TRADEMARK OFFICE
CERTIFICATE OF CORRECTION

PATENT NO. : 5,628,038
DATED      : May 6, 1997
INVENTOR(S): MASAKI HIGASHIHARA

It is certified that error appears in the above-indentified patent and that said Letters Patent is hereby corrected as shown below:

COLUMN 2

Line 38, "tile" should read --the--.
    Line 52, "tile" should read --the--.

COLUMN 3

Line 36, "tile" should read --the--.
    Line 51, "tile" should read --the--.
    Line 62, "tile" should read --the--.

COLUMN 6

Line 6, advantaged" should read --advantages--.

COLUMN 7

Line 26, "where in" should read --wherein--.

Signed and Sealed this

Fourteenth Day of October, 1997

*Attest:*

BRUCE LEHMAN

*Attesting Officer*     *Commissioner of Patents and Trademarks*